March 29, 1949. P. T. TUCKER 2,465,825
STEERING WHEEL MOUNTED INSTRUMENT PANEL
Filed March 24, 1947 3 Sheets-Sheet 1

INVENTOR
PRESTON T. TUCKER
BY
Toulmin & Toulmin
ATTORNEYS

March 29, 1949.  P. T. TUCKER  2,465,825
STEERING WHEEL MOUNTED INSTRUMENT PANEL
Filed March 24, 1947  3 Sheets-Sheet 2
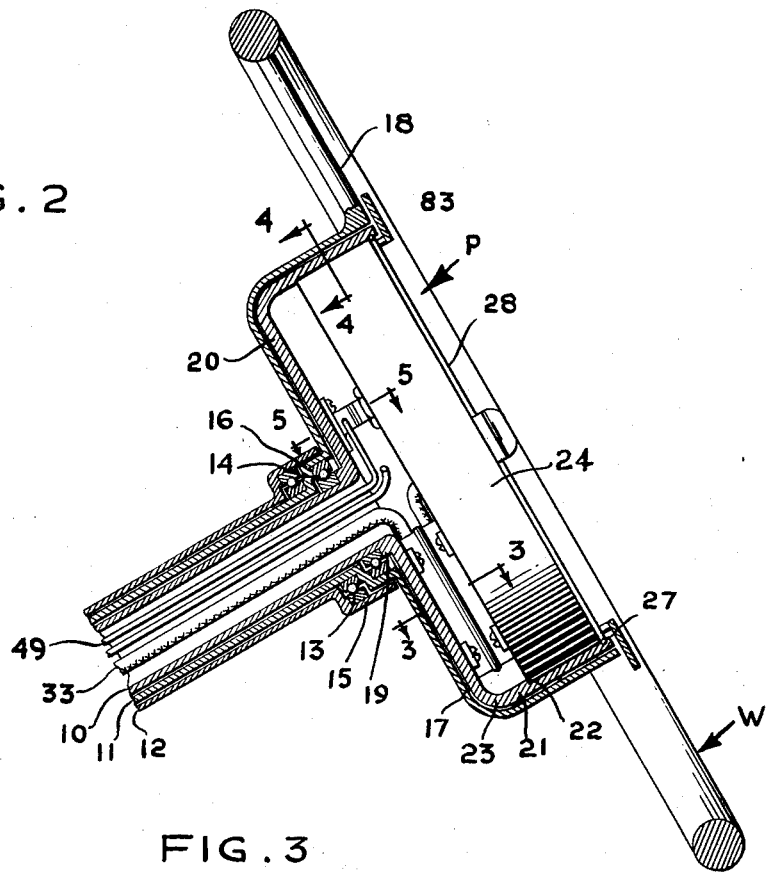
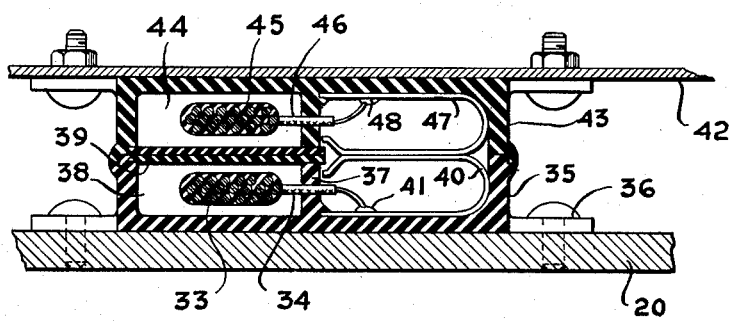
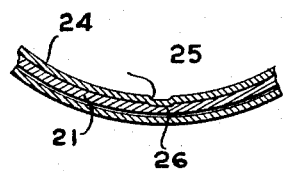
INVENTOR
PRESTON T. TUCKER
BY
Toulmin & Toulmin
ATTORNEYS March 29, 1949.    P. T. TUCKER    2,465,825
STEERING WHEEL MOUNTED INSTRUMENT PANEL
Filed March 24, 1947    3 Sheets-Sheet 3

INVENTOR
PRESTON T. TUCKER
BY
Toulmin & Toulmin
ATTORNEYS

Patented Mar. 29, 1949

2,465,825

UNITED STATES PATENT OFFICE 2,465,825

STEERING WHEEL MOUNTED INSTRUMENT PANEL

Preston T. Tucker, Ypsilanti, Mich., assignor to The Tucker Corporation, Chicago, Ill., a corporation of Delaware Application March 24, 1947, Serial No. 736,882

12 Claims. (Cl. 180—78)

This invention relates to the instrument panel of a motor vehicle and is concerned primarily with a novel arrangement whereby the panel is mounted within the conventional steering wheel.

In accordance with the precepts of modern automotive engineering an automobile ordinarily includes several instruments which have their gauge faces mounted in a position where they may be seen by the driver. Among such instruments might be noted the ammeter, oil pressure gauge, engine thermometer, and the gasoline gauge.

Moreover, it has been the usual practice to mount these several gauges on the dashboard just below the windshield. With this arrangement at least some of the gauges are removed an appreciable distance from the driver at one side and oft times considerable difficulty is experienced by the driver in reading the gauges as he is driving.

With the foregoing conditions in mind this invention has in view, as its foremost objective, the provision of an instrument panel of the character indicated which is designed for assembly and mounting within the steering wheel of a motor vehicle. With the instrument panel so located the driver of a car is enabled at all times to squarely view the various gauges with a maximum of visibility. Moreover, the instruments may be easily read with a minimum of distraction from the driving operation.

In carrying out the above noted idea in a practical embodiment the invention contemplates taking advantage of the features of the steering column construction which are adapted to this mounting of the instrument panel. Of necessity, the steering wheel is rotatable. It is, therefore, carried on a rotatable sleeve which extends to the steering connections. This sleeve encloses a stationary steering column and is surrounded by another stationary casing.

In accordance with the present invention the free end of the sleeve carrying the wheel is enlarged so as to define a large open cup-shaped well to which the steering wheel is attached. The free end of the stationary steering column is formed with a complemental well structure and the instrument panel of this invention is mounted within this well of the steering column.

A highly important object of the invention is the provision, in an instrument panel mounting of the character aforesaid, of means providing for the detachable assembly of the panel itself within the well.

More in detail, the invention has as an object the provision, in an instrument panel mounting, of complemental electrical connections, one half of which are permanently affixed to the stationary well structure and the other half of which are secured to a removable panel.

Inasmuch as an instrument panel ordinarily includes a gauge for indicating oil pressure, it is necessary to provide a conduit which communicates with the gauge face on the panel.

Another important object of the invention is the provision, in an instrument panel of the type indicated, of a breakable connection for such an oil conduit and in attaining this end it is necessary to provide means for closing each end of the conduit at the point where the connection is broken.

Still another object of the invention is to provide, in an instrument panel assembly of the character indicated, removable means for holding the instrument panel in assembled position within the well. This means may take the form of a snap ring which is positioned in a groove formed on the inner cylindrical surface of the well.

From the foregoing it is evident that the removable panel must be accurately positioned in angular relation with respect to the stationary well structure. Thus, another highly important objective in view lies in the provision of means for positively insuring that the panel is properly positioned. This end may be achieved by providing complemental interfitting elements on the panel and well structure, respectively.

Another object of the invention is to provide, in combination with a steering wheel mounted on a rotatable steering column, an instrument panel which includes a plurality of gauge faces that are operatively connected to various elements in an automobile.

More in detail, an object is to provide an instrument panel of the type identified in the preceding paragraph which is removable and in which the various gauge faces are connected to the elements in the automobile by electrical connections that are readily breakable to facilitate this removal.

Various other more detailed objects and advantages of the invention such as arise in connection with carrying out the above noted thoughts in a practical embodiment will in part become apparent and in part be hereinafter stated as the description of the invention proceeds.

The invention, therefore, comprises an instrument panel which is removably mounted within the steering wheel of an automobile together with mechanisms providing the various electrical and conduit connections to the several gauge faces on the panel and means for accurately positioning the panel and holding it in such position.

For a full and more complete understanding of the invention reference may be had to the following description and accompanying drawings wherein:

Figure 2 is a vertical section through the steering wheel structure with the panel brought out in elevation;

Figure 3 is an enlarged detailed sectional view being taken about on the plane represented by the line 3—3 of Figure 2;

Figure 4 is another enlarged detailed sectional showing which is taken about on the plane represented by the line 4—4 of Figure 2;

Figure 1:
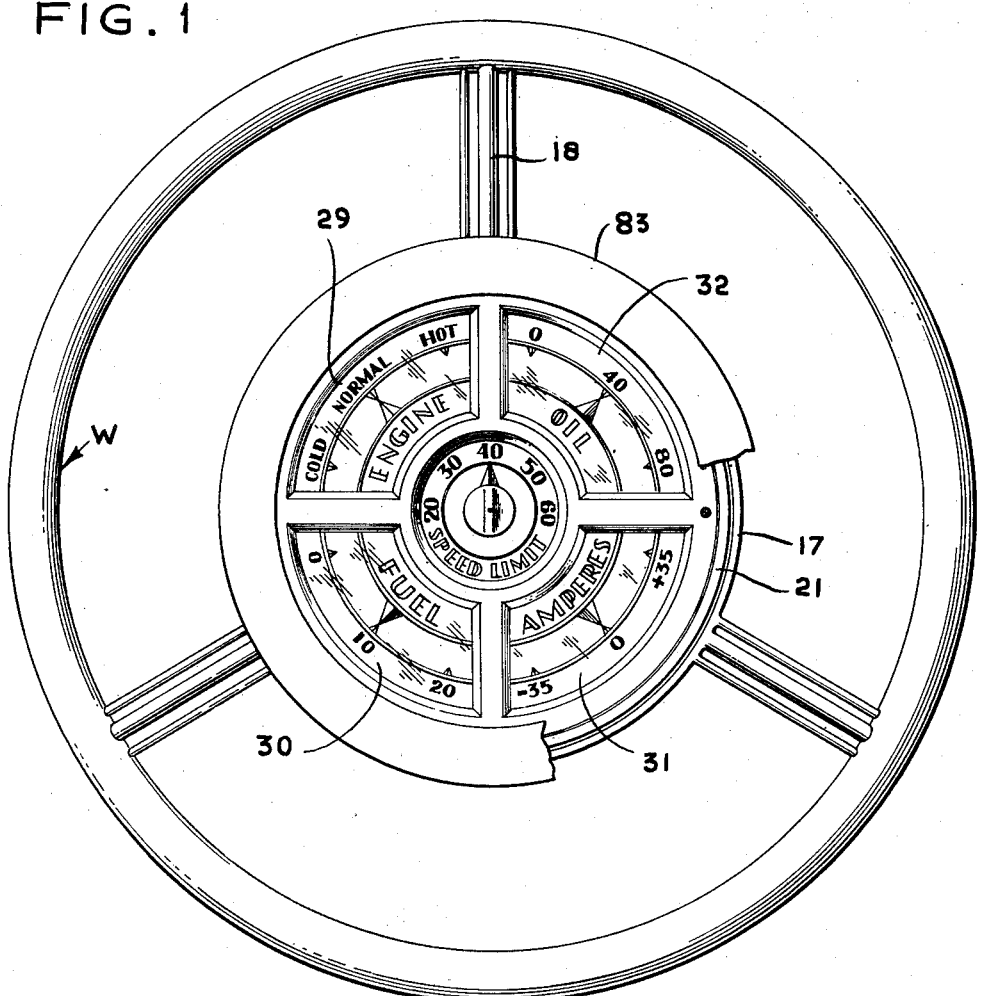
Figure 1 is a top plan view of a steering wheel with an instrument panel mounted therein in accordance with the principles of this invention.

Referring now to the drawings wherein like reference characters denote corresponding parts and first more particularly to Figure 2, a stationary steering column of tubular construction is designated 10. Surrounding the column 10 and in slightly spaced relation therefrom is a rotatable sleeve 11 while a stationary casing 12 encloses the sleeve 11. It will be noted that there is a bearing assembly 13 between the casing 12 and sleeve 11 and another bearing assembly 14 between the sleeve 11 and column 10.

The column 10, sleeve 11, and casing 12 are all co-axially assembled with their axis assuming the inclined position illustrated in accordance with common practice in this art. The outer free end of the casing 12 terminates in a slightly enlarged cup 15 which accommodates the bearing assembly 13. Likewise, the sleeve 11 is first enlarged to provide a cup-shaped structure at 16 which accommodates the bearing assembly 14 and it is then further deformed to provide the large open face cup-shaped structure 17. A steering wheel which is referred to in its entirety by the reference character W has spokes 18 which are connected, preferably integrally, to the free peripheral edge of the cup-shaped structure 17.

The steering column 10 is formed with a shoulder at 19 which cooperates with the cup 16 in positioning the bearing assembly 14. Just beyond the shoulder 19 the steering column 10 is enlarged to provide a well structure consisting of a bottom flat annular wall 20 and a cylindrical wall 21 which is formed with the shoulder at 22. It will be noted that the flat wall 20 and cylindrical wall 21 are integrally joined by the bend or curve shown at 23. This well structure on the stationary steering column accurately conforms in shape to the cup 17 on the steering sleeve within which it is received in slightly spaced relation.

An instrument panel is identified in its entirety by the reference character P. This panel P is of cylindrical formation with an outer diameter substantially equal to the diameter of the well wall 21 above the shoulder 22. Thus, the panel P may be fitted into the well and the insertion continued until it abuts the shoulder 22. The latter shoulder accurately determining this phase of positioning the panel P.

It is also necessary that the panel P have a proper angular relation with respect to the well structure. Thus, the circular housing of the panel P which is identified at 24 is formed with an external key 25 as is shown in Figure 4. The cylindrical wall 21 of the well is formed with a key-way 26 that is adapted to receive the key 25. It is evident that it is only when the key 25 and key-way 26 are in alignment that the panel P may be inserted into the well wall 21. Adjacent to its outer free edge the inner cylindrical face of the wall 21 is formed with an annular groove 27 which receives a retaining ring 28. The latter is a conventional spring ring which is snapped into position in the groove and due to its normal tendency to expand remains in position in the groove. In this position it retains the panel P in its assembled position within the steering column well. Obviously, the ring 28 may be removed to permit withdrawal of the panel P.

It is evident that the instrument panel P considered in its entirety may be designed to accommodate any desired number of instrument gauges. Thus, in the form of the invention illustrated in the drawings the panel P is shown as housing four gauges. Obviously, this particular number is not a limitation of the invention as it may be varied as occasion demands. Upon referring to Figure 1 it will be noted that the panel P includes a thermometer or engine temperature gauge designated 29, a gasoline gauge 30, an ammeter 31, and an oil pressure gauge 32. The particular mechanisms making up these several gauges are not a part of this invention. It is sufficient to note that the gauges 29, 30, and 31 are responsive to changes in an electrical current. Thus, they may be electrically operated. On the other hand, the oil pressure gauge 32 is responsive to changes in oil pressure and provision must be made for conducting oil at the pressure of the engine to this gauge 32.

Referring now more particularly to Figures 2 and 3, the arrangement for providing the electrical connections to the panel P will be described. A cable 33 extends through the bore of the tubular column 10 and houses wires going to the several instruments which must be electrically connected to the gauges in the panel P. One such wire is designed 34. A shallow open face panel of insulating material is designated 35 and is mounted on the upper face of the wall 20 by the ear and screw connection shown at 36. A partition 37 divides the panel 35 into two sections. One of these is a chamber 38 which is closed by a top closure 39 and which houses the cable 33. The other section is divided off into a plurality of stalls each of which receives a spring contact 40. It will be noted that the wire 34 is conductively connected to one arm of the contact 40 by the solder connection shown at 41.

The housing of the panel P includes a bottom flat wall 42. Mounted on the under face of this wall 42 is another open-faced panel 43 of insulating material. The panel 43 is a substantial duplicate of panel 35. The panel 43 includes a cable chamber 44 in which is positioned a cable 45 that includes several wires 46 each of which extends to one of the instrument gauges. The insulating panel 43 is also formed with a plurality of open stalls each of which receives a spring contact 47. It will be noted that each wire 46 is electrically connected to one arm of one contact 47 by the solder connection shown at 48.

The insulating panels 35 and 43 together with the cables, wires, and contacts included therein constitute what is known as a "quick disconnector" or "quickly detachable harness." Such a device is the subject of Kenneth E. Lyman patent application entitled "Quick disconnector for electrical systems," S. N. 731,778, and assigned to the same assignee as the present invention. In this application the structure of this disconnector is described in detail. For the purposes of this specification it suffices to point out that when the panel P assumes its proper angular position within the steering column well, as determined by the key 25 and key-way 26, the respective contacts 40 and 47 are in proper alignment. When the parts are disassembled each of these contacts includes a free arm which projects above the plane of the stalls. However, as the panel P is inserted in the steering column well, these free arms engage and assume the face to face contacting relation depicted in Figure 3. Thus, the electrical circuit to each instrument gauge is completed.

Figure 5:
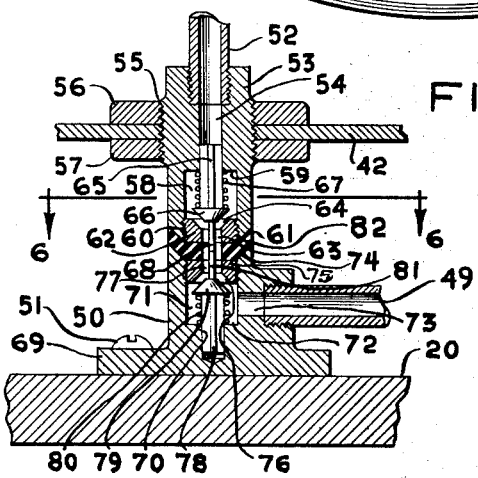
Figure 5 is an enlarged detailed sectional view of the oil gauge connection and is taken about on the plane represented by the line 5—5 of Figure 2.
Figure 6:
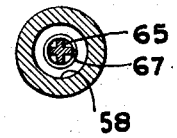
Figure 6 is a section through the connection shown in Figure 5, being taken about on the plane represented by the line 6—6 of Figure 5.

Referring now more particularly to Figures 5 and 6, the conduit to the oil connection 29 will be described. It must first be noted that an oil pressure conduit 49 extends upwardly through the tubular column 10 and is bent over into the normal position illustrated in Figure 1 so that it may be connected to a fitting 50 which is secured to the upper face of the wall 20 as by screws shown in 51.

The oil gauge 32 includes a conduit 52 which receives oil under pressure to operate the indicator of the gauge. The free end of the conduit 52 is threaded and screwed into the internally threaded end of a nipple 53 having a bore 54 in alignment with the bore of the conduit 52. The nipple 53 is exteriorly threaded as shown at 55 and nuts 56 and 57 which are screwed onto these threads 55 engage the housing wall 42 on either side to securely position the nipple 53. At the end opposite to the connection of the conduit 52 with the nipple 53 the latter is formed with an enlarged bore 58 which defines a shoulder 59. The free end of this enlarged bore 58 is internally threaded as indicated at 60. It is to be noted that the free end of the nipple itself has a truncated conical surface 61.

A valve seat ring 62 is externally threaded and screwed into the threads 60. This ring is formed with a bore 63 which terminates at its inner end in a conical valve seat 64. A valve stem 65 of the cross web construction shown in Figure 6 is slidably positioned in the bore 54 and extends into the enlarged bore 58. The end of the stem within this bore 58 carries a valve member 66 that is complemental to and adapted to be received in the valve seat 64.

An expansion coil spring 67 bears against the shoulder 59 at one end and the valve member 66 at the other. The normal tendency of the spring 67 is to maintain the valve member 66 in seated position on the seat 64, in which case the bore 63 is closed. Extending down into the bore 63 and beyond the free end of the ring 62 is a needle 68 which is anchored at its upper end to the valve member 66.

The structure above described in connection with the nipple 53 is substantially duplicated in the fitting 50. The latter includes a base 69 which is secured to the wall 20 by the screws 51. This base is formed with a cylindrical bore 70 which opens into a chamber 71, there being a shoulder 72 between the two. Extending into the chamber 71 from one side is a bore 73 which communicates with the conduit 49. The wall structure defining the chamber 71 is of circular formation and the free end thereof is formed with an undercut conical surface 74 which is complemental to the conical surface 61. Adjacent to its open end the cylindrical chamber 71 is internally threaded and a valve seat ring 75 is screwed thereinto.

This valve seat ring is formed with a valve seat 76 and a bore 77 which is adapted to align with the bore 63. A valve stem 78 of the same cross web formation as the valve stem 65 is slidably positioned in the bore 70. At its upper end it carries a valve member 79 of conical formation complemental to the seat 76. A spring 80 bears against the shoulder 72 at one end and the valve member 79 at the other. The normal tendency of this spring is to maintain the valve member 79 in sealing position on the seat 76 thereby closing the bore 77.

A needle 81 is carried by the valve member 79 and extends upwardly through the bore 77 beyond the free end thereof. The fitting 50 at the conical surface 74 carries a compressible packing member 82 of a shape corresponding to the conical surfaces 61 and 74 and the ends of the valve seat rings 62 and 75.

With the panel P removed from the well the spring 67 causes the valve member 66 to bear against the seat 64 and close the bore 63. Thus, no oil can leak out of the oil pressure gauge 32. At the same time the spring 80 causes the valve member 79 to close the bore 77. This prevents any leakage from the conduit 49. However, when the panel P is assembled within the well with the angular position properly determined by the key 25 and key-way 26, the needles 68 and 81 abut one another in the manner illustrated to unseat the valve members 76 and 79 from their respective seats and thereby open the bores 63 and 77 and establish communication from the conduit 49 to the conduit 52. Thus, the oil pressure gauge 32 is operatively connected to the engine.

As shown in Figures 1 and 2, a ring 83 which is intended as the operating medium for the horn of the car may be positioned over the outer peripheral edge of the panel P. This ring should preferably be detachably mounted so as to permit withdrawal of the panel P in the manner above described.

The modification

Figures 7, 8:
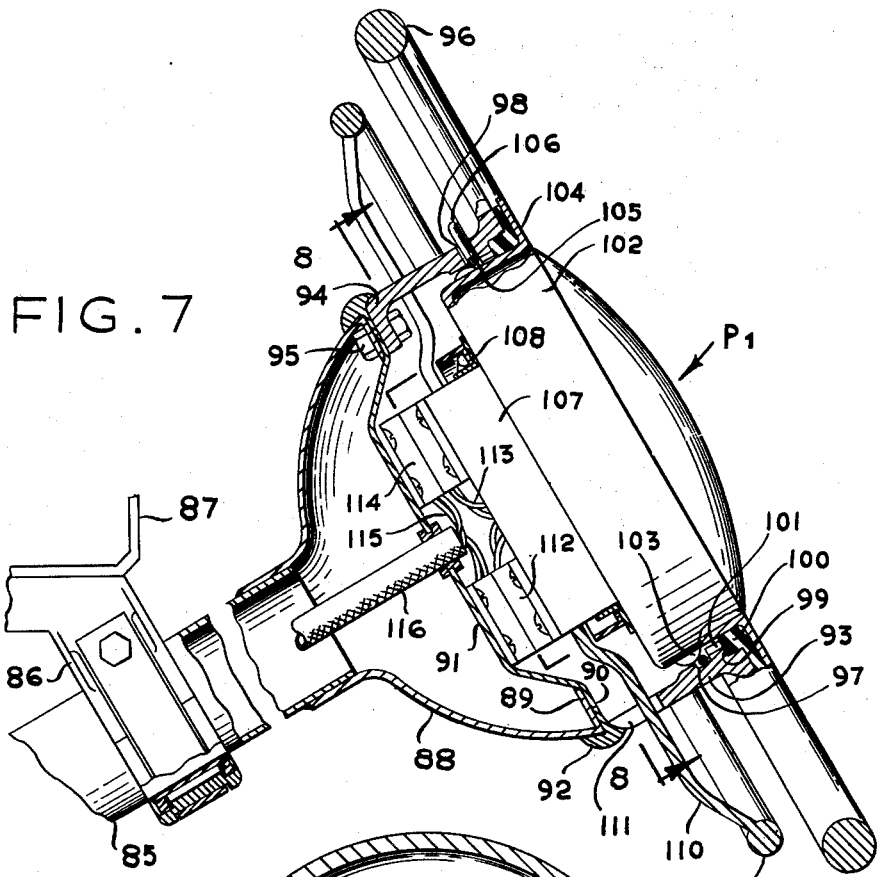
Figure 7 is a view somewhat similar to Figure 2 of a modified form of the invention. In this view the steering column and wheel are shown in section while the removable panel is brought out largely in elevation.
Figure 8 is a section taken on a plane normal to the axis of the steering column shown in Figure 7.

Figures 7 and 8 illustrate a modified form of the invention in which a single rotatable steering column is employed. Such a column is depicted at 85 and is journaled in a bracket 86, which depends from the framework of the car immediately below the dashboard which is depicted at 87.

The upper end of the column 85 carries a bell-shaped member 88, which terminates at an annular flange 89. A plate 90, having a deformed central part 91 is fitted over the inturned flange 89. The outer periphery of this plate 90 takes the form of a finishing bead 92. A sleeve 93 carries an inturned flange 94, which engages the plate 90, and headed bolts and nuts shown at 95 serve to clamp the sleeve 93 to the bell-shaped member 88 with the plate 90 sandwiched in between. A steering wheel 96 is secured to the sleeve 93 by the usual spokes corresponding to those shown at 18 in Figure 1.

The inner bore of the sleeve 93 is formed with an annular groove 97, with which communicates an aperture 98 that extends through the wall of the sleeve. The purpose of this will be later described. The outer end of the bore of the sleeve 93 is enlarged to provide a shoulder 99, and engaging the shoulder is an L-shaped packing ring 100. The wall defining the bore of the sleeve 93 is also formed with a plurality of longitudinally extending grooves 101.

An instrument panel is referred to in its entirety by the reference character $P_1$. This panel comprises a cylindrical main body portion 102, carrying outwardly projecting lugs 103, which are received in the longitudinal grooves 101. Extending outwardly from the main body portion 102 is an annular flange 104 which overlies the packing member 100.

It will be noted that after the panel $P_1$ is inserted in the position illustrated in Figure 7, a retaining ring 105, which is received in the groove 97 engages the lugs 103 to hold the panel in the assembled position. This retaining ring 105 may be formed with an extension 106, which passes through the aperture 98 and is available as a means for expanding the ring to permit withdrawal of the panel P.

Carried by the inner face of the main body portion 102, is an inner body member 107 of smaller dimension than the body 102. It will be noted that the members 102 and 107 carry the elements of a horn switch indicated at 108. A horn operating ring is designated 109 and has arms 110 which extend through slots 111 formed in the sleeve 93. Thus, when the driver of the car engages the ring 109 with his fingers and exerts a pressure thereon, the elements at 108 are affected to complete the circuit and sound the horn.

The inner face of the panel body section 107 carries a plurality of contact elements shown at 112 which are connected by wires 113 to the various instruments or gauges contained within the panel $P_1$. A plurality of complemental contact elements 114 are located within the depressed part 91 of the plate 90. The contact elements 114 correspond in number and arrangement to the contacts 112. They are connected by wires 115 to a main cable 116 which extends down through the tubular steering column 85. This cable 116 is flexible and has sufficient play to accommodate rotation of the steering column.

When the body portion 102 is inserted in the sleeve 94, the body 102 must be rotated until lugs 103 are in mating relation with grooves 101, thereby insuring proper orientation of body 102 to insure proper engagement of contacts 112 and 114.

While preferred specific embodiments of the invention are hereinbefore set forth, it is to be clearly understood that the invention is not to be limited to the exact proportions and steps illustrated and described because various modifications of these details may be provided in putting the invention into practice within the purview of the appended claims.

What is claimed is:

1. In combination, a tubular steering column having a well structure at one end, said well structure being defined by a bottom and a side wall, an instrument panel assembled within said well structure and spaced from said bottom to provide a chamber, and complemental elements of a detachable electrical connection within said chamber, one half of said elements being anchored to said bottom wall and the complemental half being secured to said panel.

2. In combination, a tubular steering column having a well structure at one end, said well structure being defined by a bottom and a side wall, an instrument panel assembled within said well structure and spaced from said bottom to provide a chamber, and complemental elements of a fluid coupling positioned in said chamber, one element being secured to said bottom wall and the complemental element being carried by said panel.

3. In combination, a tubular steering column carrying a well structure defined by a bottom and a side wall, an instrument panel in said well structure spaced from said bottom wall to provide a chamber, said panel including an oil pressure gauge, an element of a fluid coupling secured to said bottom, a conduit within said column communicating with said element, a complemental coupling element carried by said panel and a conduit connecting said complemental element to said oil pressure gauge.

4. In combination, a tubular steering column carrying a well at one end, said well being defined by a bottom and a circular wall, an instrument panel within said well structure and spaced from said bottom to provide a chamber, an oil pressure gauge included in said panel; electrically operated gauges also included in said panel, a conduit in said column, complemental elements of a fluid coupling in said chamber, one of said elements being anchored to said bottom and connected to said conduit, the complemental coupling element being secured to said panel and connected to said oil gauge, a cable including wires within said column, and a harness within said chamber connected to the wires of said cable, said harness comprising a plurality of spring contacts secured to said bottom and connected to said wires, and a corresponding number of complemental contacts secured to said panel and connected to said electrically operated gauges.

5. In a steering wheel instrument panel, a stationary tubular steering column having a cup-shaped well at its upper end defined by a bottom and a side wall, an instrument panel having a shape corresponding to said well and snugly received therein in a position spaced from said bottom, removable means for maintaining said panel within said well, means for insuring of the proper angular relation of said panel with respect to said well, an oil pressure gauge included in said panel, elements of a breakable fluid connection between said bottom and said panel, one of said elements being connected to said oil pressure gauge and a conduit within said tubular column connected to the other of said elements.

6. In a steering wheel instrument panel, a stationary tubular steering column having a cup-shaped well at its upper end defined by a bottom and a side wall, an instrument panel having a shape corresponding to said well and snugly received therein in a position spaced from said bottom, removable means for maintaining said panel within said well, means for insuring of the proper angular relation of said panel with respect to said well, an electrically operated gauge included in said panel, elements of a breakable electrical connection between said bottom and said panel, one of said elements being connected to said gauge and a cable within said tubular bore connected to the other of said elements.

7. In a steering wheel instrument panel, a stationary tubular steering column having a cup-shaped well at its upper end defined by a bottom and side wall, an instrument panel having a shape corresponding to said well and snugly received therein in a position spaced from said bottom, removable means for maintaining said panel within said well, means for insuring of the proper angular relation of said panel with respect to said well, an oil pressure gauge included in said panel, an electrically operated gauge also included in said panel, elements of a breakable fluid coupling between said bottom and said panel, one of said coupling elements being connected to said oil pressure gauge, a conduit within said tubular column connected to the other of said elements, elements of a breakable electrical connection between said bottom and said panel, one of said elements being connected to said electrically operated gauge, and a cable within said column connected to the other element of said breakable electrical connection.

8. In an automobile and in combination, a rotatable steering column, a bell-shaped member carried at the upper end of said column, a sleeve secured to said bell-shaped member, a steering wheel carried by said sleeve, an instrument panel within said sleeve, and complemental elements of a breakable electric connection on said panel, and bell-shaped member, respectively.

9. In a steering wheel and instrument panel assembly, a tubular rotatable steering column, a bell-shaped member at the upper end of said column, a plate carried by said bell-shaped member, a contact element on said plate, a cable extending through said column, and connected to said contact element, a sleeve secured to said bell-shaped member, an instrument panel within said sleeve, a contact element on said instrument panel adapted to engage said first contact element, and a steering wheel carried by said sleeve.

10. In a steering wheel and instrument panel assembly, a sleeve adapted to be connected to a rotatable steering column, said sleeve being formed with an inner annular groove, and an inner longitudinal groove. A steering wheel carried by said sleeve, an instrument panel having an outward extending lug adapted to be received in said longitudinal extending groove, and a retaining ring in said annular groove for holding said panel in assembled position within said sleeve.

11. In a steering wheel and instrument panel assembly, a bell-shaped member adapted to be connected to a rotatable steering column, a plate carried by said bell-shaped member, a plurality of contacts on said plate, a cable embracing a plurality of wires corresponding in number to said contacts, and each of which is connected to one of said contacts, a sleeve secured to said bell-shaped member, a steering wheel carried by said sleeve, a removable instrument panel within said sleeve, and a plurality of contacts on the inner face of said panel, corresponding in number and arrangement to the contacts on said plate, and adapted to engage therewith.

12. In a steering wheel and instrument panel assembly, a bell-shaped member adapted to be connected to a rotatable steering column, a plate carried by said bell-shaped member, a plurality of contacts on said plate, a cable embracing a plurality of wires corresponding in number to said contacts, and each of which is connected to one of said contacts, a sleeve secured to said bell-shaped member, a steering wheel carried by said sleeve, a removable instrument panel within said sleeve, means for holding said panel within said sleeve, a plurality of contacts on the inner face of said panel corresponding in number and arrangement to the contacts on said plate, and adapted to engage therewith, and means for determining the proper angular position of said panel with respect to said sleeve to insure proper engagement of said contacts.

PRESTON T. TUCKER.

REFERENCES CITED

The following references are of record in the file of this patent:

UNITED STATES PATENTS

| Number | Name | Date |
| --- | --- | --- |
| 1,396,195 | Grigsby | Nov. 8, 1921 |
| 1,944,905 | Rowell | Jan. 30, 1934 |
| 2,123,483 | Langille | July 12, 1938 |
| 2,193,223 | Chayne et al. | Mar. 12, 1940 |
| 2,202,781 | Kennedy | May 28, 1940 |
| 2,206,512 | Reinholz et al. | July 2, 1940 |

FOREIGN PATENTS

| Number | Country | Date |
| --- | --- | --- |
| 130,858 | Great Britain | Aug. 14, 1919 |